March 14, 1939.    J. R. MORRIS    2,150,391
SHEET GLASS BREAKING APPARATUS
Filed Sept. 6, 1935    2 Sheets-Sheet 1

Inventor
JOSEPH R. MORRIS.
By Frank Fraser
Attorney

March 14, 1939.   J. R. MORRIS   2,150,391
SHEET GLASS BREAKING APPARATUS
Filed Sept. 6, 1935   2 Sheets-Sheet 2

Inventor
JOSEPH R. MORRIS.
By Frank Fraser
Attorney

Patented Mar. 14, 1939

2,150,391

UNITED STATES PATENT OFFICE 2,150,391

SHEET GLASS BREAKING APPARATUS

Joseph R. Morris, Toledo, Ohio, assignor to Libbey-Owens-Ford Glass Company, Toledo, Ohio, a corporation of Ohio Application September 6, 1935, Serial No. 39,363

6 Claims. (Cl. 49—48)

The present invention relates broadly to the cutting of glass sheets and more particularly to the breaking or cracking of the sheets subsequent to the scoring thereof along the proposed line of cut.

The aim of the invention is the provision of an improved apparatus of simple reliable construction which will operate to automatically break the glass sheets along the score lines as the said sheets are being carried continuously forwardly thereby, reducing the use of hand labor to a minimum as well as accelerating production; the apparatus operating in a positive efficient manner so that a clean break may be had and uniform results obtained in the cracking of a large number of successive sheets.

Other objects and advantages of the invention will become more apparent during the course of the following description when taken in connection with the accompanying drawings.

Figure 1:
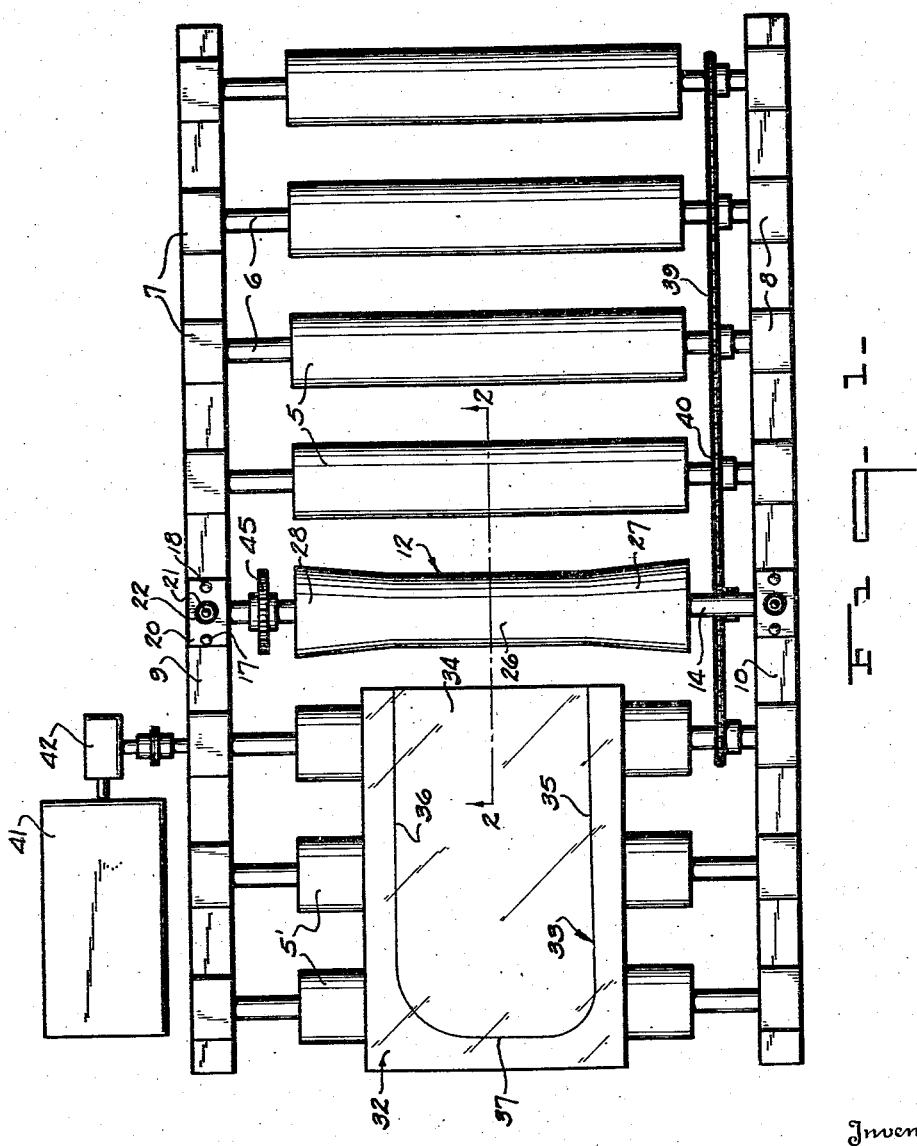
Figure 2:
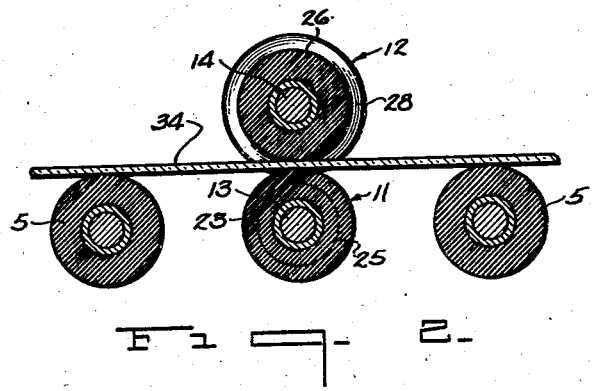
Figure 3:
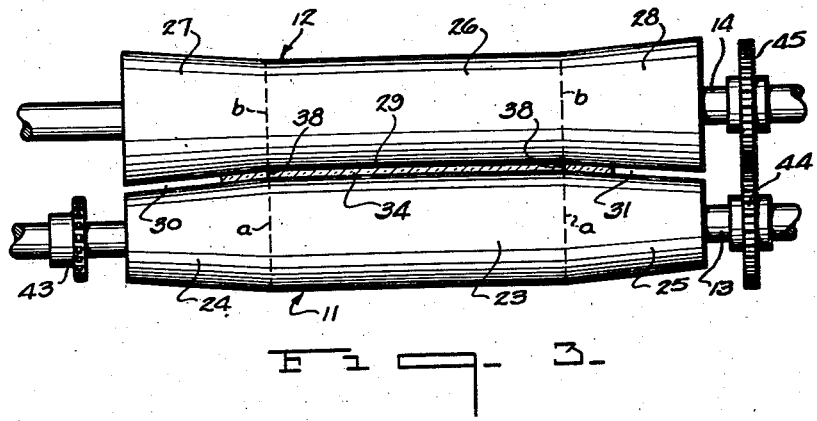
Figure 4:
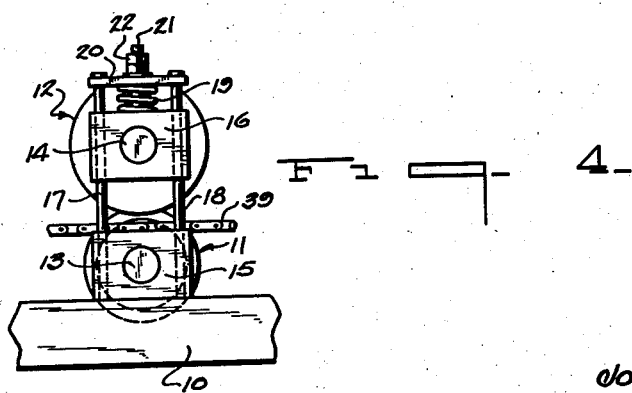

In the drawings wherein like numerals are employed to designate like parts throughout the same, Fig. 1 is a plan view of a glass breaking apparatus constructed in accordance with the present invention, Fig. 2 is a sectional view taken substantially on line 2—2 of Fig. 1, Fig. 3 is a side elevation of the breaking rolls, and Fig. 4 is an end view thereof showing the mounting for said rolls.

In the embodiment of the invention illustrated in the drawings, there is provided a horizontal runway consisting of a series of horizontally aligned conveyor rolls 5 which are adapted to receive the glass sheets thereupon and to carry the same continuously forwardly during the breaking operation. These rolls are mounted upon shafts 6 journaled at their opposite ends in bearings 7 and 8 carried by the longitudinally extending supporting members 9 and 10 respectively. The conveyor rolls 5 are preferably formed of rubber or some other material which will not mar or scatch the surface of the glass sheets.

Interposed within the length of the runway are the superimposed breaking rolls 11 and 12 which serve to crack the glass sheet along the score line as the said sheet passes therebetween, the pair of breaking rolls being substituted for one of the conveyor rolls 5 and the lower breaking roll 11 being in horizontal alignment with the conveyor rolls. The breaking rolls 11 and 12 are mounted upon shafts 13 and 14 respectively, the shaft 13 of the lower roll being rotatably mounted at each end in a stationary bearing block 15 (Fig. 4) carried by the corresponding supporting member 9 or 10, while the shaft 14 of the upper roll is rotatable at each end in a bearing block 16 slidably mounted upon the two vertical pins 17 and 18 carried by the stationary bearing block 15. The upper breaking roll 12 is yieldably urged toward the lower roll 11 by a compression spring 19 at each end thereof, said spring bearing at one end against the bearing block 16 and at its opposite end upon a horizontal plate 20 carried at the upper ends of pins 17 and 18. Secured to the bearing block 16 and extending upwardly through the plate 20 is a screw 21 having threaded thereon a nut 22 which limits the downward movement of the bearing block and consequently the movement of roll 12 toward roll 11.

The glass sheet, after being scored, is passed between the breaking rolls 11 and 12, which cooperate with one another to apply a bending movement to the glass sufficient to snap the same along the score lines.

In carrying out the invention, the lower breaking roll 11 is formed with a cylindrical central portion 23 of uniform diameter and the tapered end portions 24 and 25, while the upper breaking roll 12 is provided with a cylindrical central portion 26 of uniform diameter and the flared end portions 27 and 28, the flared end portions of roll 12 being disposed opposite the tapered end portions of roll 11. With this arrangement, it will be apparent that the pass between the two breaking rolls comprises a substantially straight central portion 29 and the downwardly inclined end portions 30 and 31. (Fig. 3.)

While the invention is of course not limited to the breaking of any particular shape or size of glass sheet, it is especially applicable to the breaking of half windshields for use in automobiles.

Heretofore, it has been customary for the windshields of automobiles to consist of a single sheet of glass extending the entire width of the machine. More recently, however, the practice has been to make the windshield of two sheets of glass which are separated at their inner adjacent edges by a substantially vertical post or other separator means arranged at the center of the machine. In Fig. 1 there is shown a sheet of glass 32 scored as at 33 to form a half windshield 34. That is to say, the section of glass inwardly of the score line 33 constitutes the half windshield, while the glass outside of the score line is waste or cullet. In making the completed windshield, two similar half windshields are used.

In cutting out the half windshield 34, the glass sheet 32 is first scored in the usual manner as at 33 to provide the substantially parallel side cuts 35 and 36 and the curved connecting cut 37. The glass sheet is then placed horizontally upon the conveyor rolls 5 and passed forwardly between the breaking rolls 11 and 12. The length of the breaking rolls is such that the point at which the lower roll 11 begins to taper, as indicated at $a$ in Fig. 3, and the point at which the upper roll 12 begins to flare, as indicated at $b$, are approximately opposite the two score lines 35 and 36. As the glass sheet passes between the two breaking rolls, the section 34 of the sheet, constituting the half windshield, will be firmly gripped across its entire width between the central cylindrical portions 23 and 26 of the said rolls, while those portions of the sheet outwardly of the score lines will pass between the correspondingly tapered and flared end portions of the rolls 11 and 12 respectively and which will operate to produce a bending strain in the sheet sufficient to break the same along the score lines. In other words, the flared end portions of breaking roll 12 serve to exert a downward pressure upon the glass outwardly of the score lines sufficient to effect a snapping of the glass along said lines as indicated at 38 in Fig. 3. It has been found that when the sheet is cracked along the lines 35 and 36, the crack will continue around the score line 37 so that when the sheet has been passed between the breaking rolls, the waste glass will be broken away from the windshield section entirely around the score line 33, leaving a clean even break.

It is of course not absolutely necessary that the score lines 35 and 36 be exactly opposite the points a and b of the rolls, it being permissible that the said score lines be positioned a limited distance to either side thereof. Further, as pointed out above, the apparatus is also adaptable to the breaking of glass sheets of other shapes and sizes. With the use of the apparatus herein provided, the breaking of the glass sheets may be accomplished in a substantially continuous manner. The sheets, as rapidly as they are scored, can be passed between the breaking rolls which will automatically crack the glass as it is being carried forwardly. In this manner, uniform results may be obtained in the breaking of a large number of successive sheets.

All or any portion of the conveyor rolls 5 may be positively driven as desired, and it is also preferred that the breaking rolls 11 and 12 be likewise positively driven. As shown in Fig. 1, the first two conveyor rolls 5' to the left of the breaking rolls are idler rolls while the remaining conveyor rolls are driven by a sprocket chain 39 passing over sprockets 40 fixed to the roll shafts 6. Motion may be transmitted to one of the conveyor rolls 5 from a variable speed motor 41 through suitable reduction gearing located in the gear case 42. The sprocket chain 39 also runs over a sprocket 43 keyed to the shaft 13 of the lower breaking roll 11, while the upper breaking roll 12 is driven from the lower roll through the intermeshing gears 44 and 45 carried by the roll shafts.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for automatically breaking glass sheets after they have been scored, means for carrying the scored sheets continuously forwardly, and a pair of oppositely disposed breaking rolls between which said sheets are passed, said rolls being provided with correspondingly tapered and flared end portions respectively which cooperate to apply a bending movement to the sheet outwardly of the score lines sufficient to effect the breaking of said sheet along said lines.

2. In an apparatus for automatically breaking glass sheets after they have been scored, means for carrying the scored sheets continuously forwardly, and a pair of oppositely disposed breaking rolls between which said sheets are passed, said rolls having central cylindrical portions engaging the sheet inwardly of the score lines and correspondingly tapered and flared end portions respectively engaging said sheet outwardly of said score lines and cooperating to apply a bending movement to the sheet sufficient to effect the breaking thereof along the said score lines.

3. In an apparatus for automatically breaking glass sheets after they have been scored, a substantially horizontal runway for carrying the sheets continuously forwardly, and a pair of superimposed breaking rolls interposed in said runway and between which the scored sheets are passed, the outer end portions of the lower roll being tapered and the outer end portions of the upper roll correspondingly flared, the said tapered and flared end portions of the rolls cooperating to apply a downward bending movement to the sheet outwardly of the score lines sufficient to effect the breaking of said sheet along said lines.

4. In an apparatus for automatically breaking glass sheets after they have been scored, a substantially horizontal runway for carrying the sheets continuously forwardly, and a pair of superimposed breaking rolls interposed in said runway and between which the scored sheets are passed, the lower roll having a central cylindrical portion and tapered end portions while the upper roll is also provided with a central cylindrical portion and flared end portions disposed opposite the tapered end portions of the lower roll, the central cylindrical portions of the rolls engaging the sheet inwardly of the score lines while the tapered and flared end portions of said rolls engage the sheet outwardly of said score lines and operate to apply a downward bending movement to the glass sufficient to break the same along said lines.

5. In an apparatus for automatically breaking glass sheets after they have been scored, means for carrying the scored sheets continuously forwardly, and a pair of oppositely disposed breaking rolls between which the scored sheets are passed, said rolls being so constructed and arranged to provide a pass therebetween comprising a straight central portion and end portions extending at an angle with respect to said central portion, the glass passing through the angular end portions of the pass being subjected to a bending movement sufficient to snap the glass along the score lines.

6. In an apparatus for automatically breaking glass sheets after they have been scored, a substantially horizontal runway for carrying the sheets continuously forwardly, and a pair of superimposed breaking rolls interposed in the length of said runway and between which the scored sheets are passed, said rolls being so constructed and arranged to provide a pass therebetween comprising a substantially straight central portion and downwardly inclined end portions, the glass outwardly of the score lines passing through the inclined end portions of the pass and being subjected to a downward bending pressure sufficient to effect breaking of the glass along said score lines.

JOSEPH R. MORRIS.